United States Patent [19]
Knudson

[11] 3,952,881
[45] Apr. 27, 1976

[54] BALE LOADER

[76] Inventor: LeRoy Andrew Knudson, P.O. Box 3, Consort, Alberta, Canada

[22] Filed: Aug. 14, 1974

[21] Appl. No.: 497,350

[30] Foreign Application Priority Data
May 22, 1974 Canada.................................. 200520

[52] U.S. Cl............................... 214/6 B; 214/77 R; 214/147 G; 214/770; 294/106; 294/110 R
[51] Int. Cl.².................... A01D 87/12; B65G 57/32
[58] Field of Search.................. 214/6 B, 6 G, 77 R, 214/80, 139, 147 G, 770; 294/87 R, 106, 107, 109, 110, 119

[56] References Cited
UNITED STATES PATENTS

| | | | |
|---|---|---|---|
| 2,471,364 | 5/1949 | Weber | 214/139 |
| 2,696,924 | 12/1954 | Madsen | 214/80 |
| 2,765,939 | 10/1956 | Hellerudi | 214/147 G |
| 2,883,230 | 4/1959 | Miller | 294/107 X |
| 3,112,136 | 11/1963 | Hammond | 294/107 |
| 3,127,040 | 3/1964 | Nieto, Jr. | 214/80 X |
| 3,187,911 | 6/1965 | Christenson | 214/770 X |
| 3,515,292 | 6/1970 | Oborny | 214/6 B |

FOREIGN PATENTS OR APPLICATIONS

| | | | |
|---|---|---|---|
| 879,496 | 10/1961 | United Kingdom | 214/147 G |
| 899,484 | 6/1962 | United Kingdom | 214/77 R |

*Primary Examiner*—Robert J. Spar
*Assistant Examiner*—L. J. Paperner
*Attorney, Agent, or Firm*—Beveridge, DeGrandi, Kline & Lunsford

[57] ABSTRACT

A bale loader comprising an elongated grab assembly along one side of a towed platform. As the platform moves forward, the grab assembly moves over a row of bales and is eventually actuated to grab a number of bales in a single operation. The overall length of the grabbed bales corresponds substantially to the length of the platform and is subsequently deposited on the platform. The grab assembly retains the grabbed bales in a slightly inclined position at the time of depositing the bales, to accomplish a tight stack of bales on the platform. The grabbing and releasing operations are effected automatically and are controlled by a special mechanical lock.

8 Claims, 13 Drawing Figures

BALE LOADER

This invention relates to a bale loader of the type used in the farm industry for loading bales on a vehicle or moving platform.

Most of the presently used bale loaders of this type are suitable for loading a single bale at a time, thus being comparatively uneconomical in use. It is also known to use bale loaders arranged so as to load a plurality of bales which have been collected and discharged in a predetermined way, usually in a compact row with the bales facing one another with their shorter sides. The known load devices of this type are comparatively complex machines expensive in manufacture and often too demanding in maintenance and repair.

It is an object of the present invention to provide a bale loader capable of loading on a movable platform or vehicle a plurality of bales at a time, which is comparatively simple to manufacture and to keep in good repair, which is easy to operate and at the same time provides for efficient loading operation.

According to the invention, a bale loader is provided which is adapted to be secured to a mobile platform on which the bales are to be loaded, comprising an elongated suspended mechanical grab assembly including pivoted jaws defining the sides of the assembly and having a front end and a rear end generally coincident with front and rear ends of said platform. The term "suspended mechanical grab" is to be interpreted as jaws which are interconnected by a mechanism, usually a toggle mechanism, and in which the jaws are mechanically urged together to a closed position to grab a load, when the grab is suspended. The loader according to the invention further comprises lifting means secured to the grab assembly so as to suspend and lift same. The lifting means can lift the grab assembly from a load engagement position wherein the assembly stands along one side of the platform a short distance above the ground, to a load release position in which the jaws release the load to deposit same on the platform. The device according to the invention further includes locking means at the rear end of the assembly for releasably maintaining the jaws in open position wherein the jaws are not urged together, although the assembly is in suspended state. The locking means are provided with a movable feeler operatively connected at one end with the locking means to release same upon actuation of the feeler, and adapted at the other end to make contact with an end of a bale as the grab assembly is moved over at least one bale, as soon as the bales reaches the rear end of the assembly to actuate the movable feeler.

The bale loader according to the invention is provided with means for maintaining the grab assembly in an inclined position to secure the desired compacting of the row of bales as they are deposited on the platform.

The grab lifting means preferably consists of two-arm assemblies one disposed at the front, and the other at the rear end of the platform, and a longitudinal beam extending between the free ends of the two-arm assemblies, the longitudinal beam suspending the grab assembly.

The advantages of the present invention over prior art will become apparent from the following description of one form of the invention, with reference to the accompanying simplified drawings. In the drawings.

Figure 1:
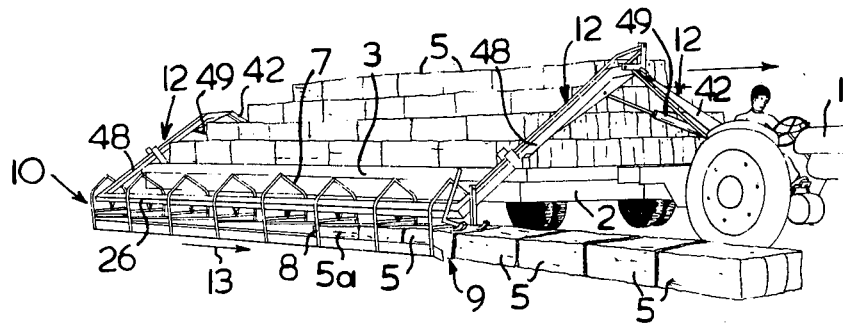
FIG. 1 through FIG. 3 are simplified perspective views of the loader with the grab assembly shown in a load engagement, load lifting and load release position, respectively.
Figure 2:
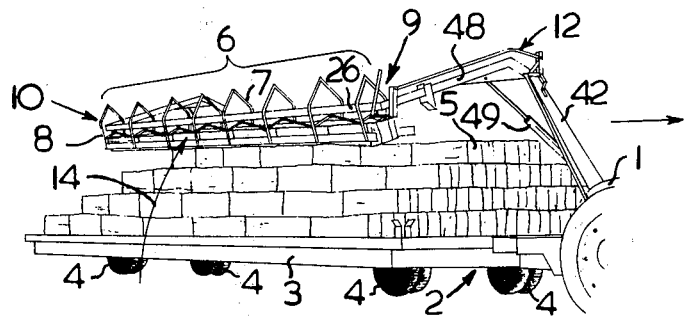
Figure 3:
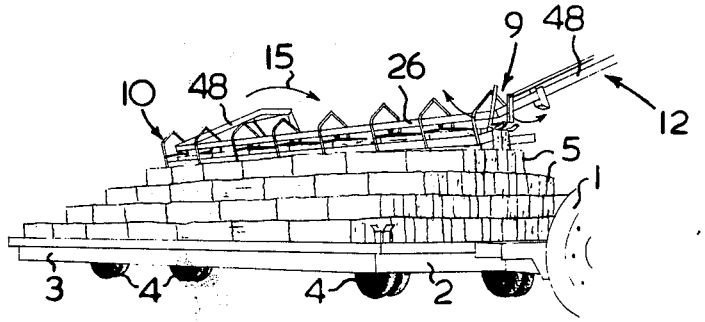

Turning now to FIGS. 1–3, the figures show a tractor 1 which is suitably connected to the front end 2 of a trailer or movable platform 3, provided with wheels 4. The platform 3 is shown loaded with bales 5.

Figure 6:
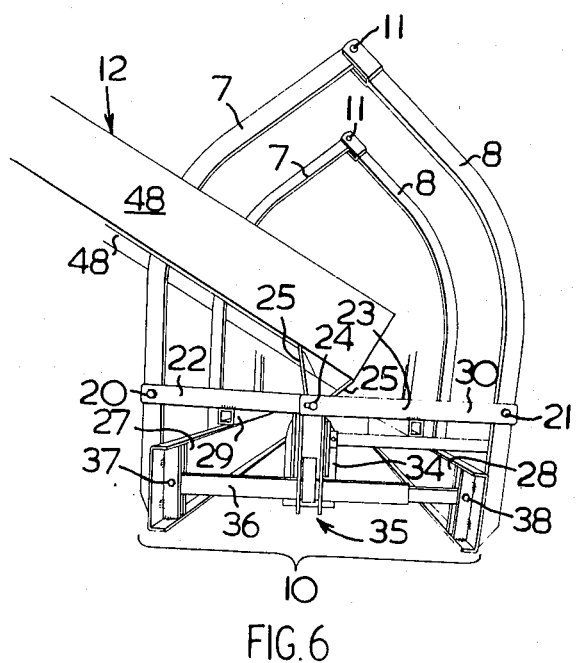
FIG. 6 is a rear view of the grab assembly with locking means engaged and maintaining the grab assembly in open state.

As best shown in FIG. 2, the loader is provided with an elongated suspended mechanical grab assembly 6 which will later be described in greater detail. It will be observed that the grab assembly 6 includes a plurality of jaws 7, 8 which define the sides of an elongated cage-shaped grab assembly 6. The cage assembly has a front end 9 and a rear end 10. As seen from FIGS. 1–3, the front end 9 of the grab assembly 6 is generally coincident with the front end 2 of the platform 3, whereas the rear end 10 of the grab assembly 6 is generally coincident with the rear end of the platform 3. Each of the pairs of jaws 7, 8 is pivotally secured to one another by a pivot pin 11 (FIG. 6). The pivot pins 11 of the jaws 7, 8, are disposed in a common axis extending along said grab assembly.

The device further comprises grab lifting means 12 (FIGS. 1–3) which will hereinafter be described in greater detail. The grab lifting means 12 are secured to the platform 3 by joints, shown e.g. in FIG. 4, but not to be seen in FIGS. 1–3.

As best seen from FIGS. 1–3, the grab lifting means 12 are used in suspending and lifting the grab assembly 6, as well as in lifting same. Shown in FIG. 1 is the basic position of the grab means 6, which can also be referred to as a load engagement position. The load engagement position is characterized by several features. The grab assembly is in "open" position as shown in FIG. 6. The grab assembly (FIG. 1) extends along one side of the platform 3 and is disposed at a short distance from the ground. As the tractor 1 moves the platform 3

(and thus the grab assembly) forward, in the direction of arrow 13, the grab assembly moves over and above a row of bales 5a, 5, which enter the grab assembly cage at the front end thereof. As the grab assembly proceeds, the bale 5a which enters the grab assembly 6 first, eventually engages a feeler 33 of the locking means (not shown in FIGS. 1–3), operatively connected to said grab assembly 6 at the rear end thereof. The locking means are used in releasably maintaining the jaws of the grab assembly in open position and will later be described in greater detail with reference to FIGS. 10, 11, 12 and 13. It will suffice at this point to mention that the locking means are provided with a movable feeler 33 one end of which is operatively connected with the locking means to release same, the other end of the feeler 33 being provided with a plate 34 for making actuating contact with the end of said bale 5a which entered the grab assembly 6 first. The feeler 33 then causes the release of the locking means which thus permit the grab assembly 6 to grab the row of bales 5a, 5 resting on the ground.

The grab lifting means 12 can now be actuated to lift the grab assembly 6 from the load engagement position upwards as shown by arrow 14 (FIG. 2) and to a load release position roughly in the direction of arrow 15 of FIG. 3. The load release position is characterized by the jaws 7, 8 of the grab assembly 6 being caused to open and to release the row of bales (also referred to as a load) so as to leave the bales deposited on the platform 3. The grab assembly 6 is now ready to be returned back to the original load engagement position shown in FIG. 1, to engage and load another row of bales 5a, 5.

The parts of the device will now be described in greater detail with reference to preferred embodiments shown in the drawings. It will be appreciated, however, that various modifications can be effected to the embodiments hereinafter disclosed, without departing from the scope of the invention as defined in the accompanying claims.

Figure 7:
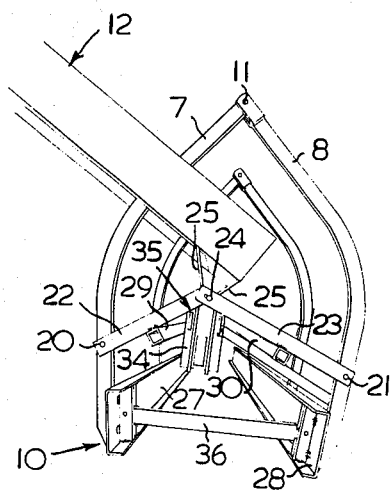
FIG. 7 is a rear view similar to FIG. 6, showing the locking means disengaged.
Figure 5:
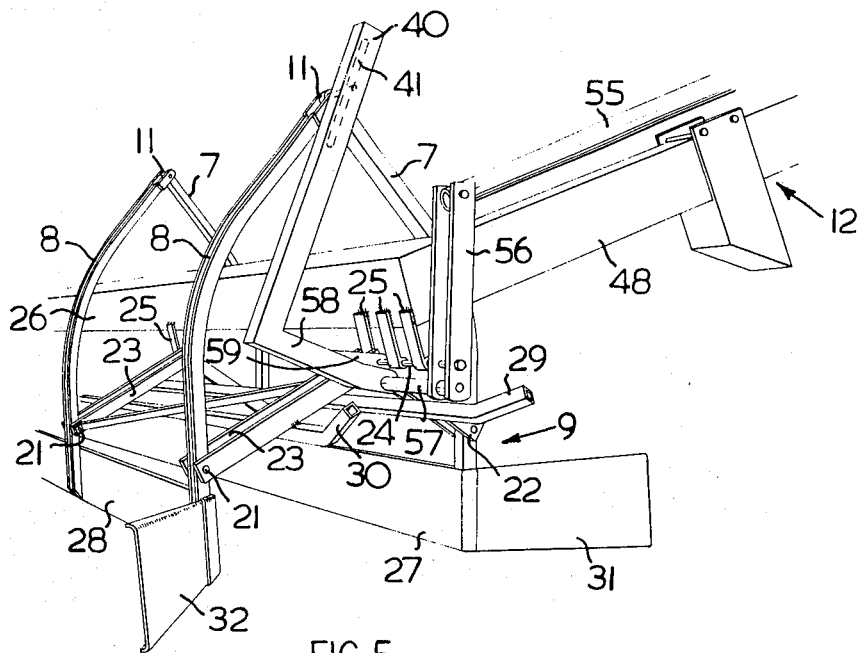
FIG. 5 is a partial perspective view showing the front end of the grab assembly.

With particular reference to FIGS. 5, 6 and 7, the basic integer of the grab assembly 6 is in a plurality of pairs of tongs each formed by two arms, also referred to as jaws 7, 8. As mentioned before, the jaws can be closed or opened by pivotal movement about the pivot pins 11. All pivot pins 11 are located in common axis extending along the grab assembly 6.

Mounted in the central lower positions of each of the jaws 7, 8 are pivots 20, 21 for pivotal connection of the jaws 7, 8 to a toggle joint, comprising two toggle links 22, 23. One end of the link 22 is thus pivotally connected to the jaw 7, whereas one end of the second link 23 is pivotally connected to the jaw 8. The links 22, 23 of each pair are pivotally connected to one another by means of a suspension pin 24 which is fixedly secured by means of bracket members 25 to a longitudinal beam 26 (FIG. 5) of the grab lifting means 12. It will be appreciated that the suspension pins 24 are arranged to have a common axis which is parallel to the common axis of the pivot pins 11. Similarly, the pivots 20 are all disposed to have a common axis, as are the pivots 21, the common axes of the pivots 20, 21 being also parallel with that of the pivot pins 11.

The above described pairs of tongs or jaws are interconnected to form a unit by means of side and top rails. Fixedly secured, e.g. welded to the lower positions of the jaws 7, 8 are elongated side rails 27, 28, respectively. As best seen from FIGS. 6 and 7, the side rails are U-shaped in cross section with the legs of the shape turned inwardly, to provide for safe gripping action of the jaws.

Fixedly secured to the links 22 is an elongated top guide rail 29, and another top guide rail 30 is fixedly secured to the system of links 23.

As best seen from FIG. 5, the front ends of the top rails 29, 30 are outwardly flared as are front extensions 31, 32 of the side rails 27, 28, respectively. The outwardly flared ends of the rails are used in facilitating the entering of the bales 5a, 5, as the grab assembly 6 is moved over a row of the bales (FIG. 1).

Thus, the grab assembly 6 is produced which has the form of an elongated cage structure.

Referring now to FIGS. 6 and 7, showing the rear end of the grab assembly 6, it will be seen that the locking means 35 are mounted at the rear end of the grab assembly. The locking means are operatively connected with the feeler 33 provided with a feeler plate 34. The structure and operation of the locking means will later be disclosed in detail. At this point, it should merely be noted that the locking means can be engaged (FIG. 6) or disengaged (FIG. 7) with a horizontal telescopic beam 36. It will be appreciated from FIGS. 6, 7 that the beam 36 is secured with its ends to pivot points 37, 38 arranged at the side rails 27, 28. Thus, the telescopic beam 36 is secured to the grab assembly 6. The upper portion of the locking means 35 is secured to the bracket member 25 of the rearmost suspension pin 24 and thus to the grab lifting means 12.

It follows from the above that the grab assembly 6 can assume an "open" position wherein the assembly is supported by telescopic beam 36 (FIG. 6), through locking means, bracket members 25 and longitudinal beam 26. Apparently in this position the telescopic beam 36 is in extended state. Alternatively, with the locking means 35 disengaged from the telescopic beam 36, the grab assembly is suspended from the longitudinal beam 26 through brackets 25, suspension pins 24 and toggle links 22, 23, the latter forcing the jaws 7, 8 to move about pivot pins 11 closer to one another (FIG. 7) to grab the bales therebetween (bales not shown in FIG. 7). It will be observed from FIG. 6 and FIG. 7, that the toggle links 22 are somewhat shorter than their associated links 23. Such arrangement shifts the axis of the suspension pins 24 slightly to the left, as viewed in FIGS. 6 and 7. As a result, the axis of the pins 24 is slightly off center of gravity of the grab assembly 6. Consequently, whereas the grab assembly 6 is in a substantially upright position while supported by the locking means 35 (FIG. 6), it will tilt sideways when suspended by the pins 24 (FIG. 7). The slight sideways inclination of the grab assembly is merely assisted by the above ratio between the lengths of the toggle links. It is governed by a mechanism which will now be described in detail.

As best seen from FIG. 5, arranged at the front end of the grab assembly is an inclined arm 40 provided with a guide slot 41 which is adapted to receive an extension of pivot pin 11 of the first pair of jaws 7, 8. The arm 40 forms one end of a mechanism for parallel motion, which will later be described in detail. At this point, it will suffice to state that the arm 40 and thus the slot 41 is maintained at a substantially constant angle of inclination with respect to the surface of the platform 3.

It will be appreciated that the jaws 7, 8 and their associated parts are bound to somewhat drop down with respect to the longitudinal beam 26 upon release of the locking means 35 from the telescopic beam 36. The downward displacement of the jaws 7, 8 can be readily appreciated by comparison of their positions shown in FIG. 6 (the jaws "up") and FIG. 7 (the jaws "down").

The above dropping down of the jaws causes displacement of the above extension of pin 11 of the first pair of jaws 7, 8 in the slot 41 (FIG. 5) in downward direction. Which — due to the inclination of the slot 41 — will result in tilting of the grab assembly 6 to an inclined position and maintaining it in the inclined position until the extension of the pin 11 moves back upwards, when the grab assembly moves "upwards" with respect to the longitudinal beam 26. In other words, the inclination occurs when the assembly 6 moves in the same direction with respect to the longitudinal beam 26. In other words, the inclination occurs when the jaws 7, 8 are "closed", i.e. grabbing the load. The grab assembly returns back to substantially upright position only when the jaws are again in "open" position such as shown in FIG. 6.

The grab lifting means 12 will now be described in greater detail. As best seen in FIGS. 1–4 the grab lifting means 12 comprise two pairs of arms, one end of each pair of arms being secured to the platform 3. Inasmuch as the two pairs of arms are substantially identical, it will suffice to describe only one of them, namely that which is disposed at the front end 2 of the platform 3 and shown in FIG. 4.

It comprises a first arm 42, one end of which is secured to the platform 3 through a first pivot joint 43 and its associated bracket 44 which is fixedly secured to the platform 3. The bracket 44 is mounted at one side of the platform 3. The axis of pivotal joint 43 can thus be considered as being substantially coincident with the side of the platform 3. The movement of the first arm 42 is effected by a hydraulic cylinder 45 pivotally secured to the platform 3, the piston rod 46 of which is pivotally secured to the arm 42.

Pivotally secured to the opposite end of the first arm 42 at a second pivot joint 47 is a second arm 48. It will be apparent that the axes of pivotal movement about the joints 43, 47 are substantially parallel with one another and with the side edge of the platform. The movement of the second arm 48 about the joint 47 is effected by another hydraulic cylinder 49 which is pivotally secured to the first arm 42, the piston rod of this second cylinder 49 being pivotally connected to the second arm.

The operation of hydraulic cylinders 45, 49 is remotely controlled by known means (not shown) from the tractor 1.

As mentioned above, the front and rear pairs of arms 42, 48 are identical in shape. Therefore, the reference numerals of respective parts used in FIGS. 1 and 3 are also identical.

As best seen from FIGS. 1–3 and 5–6, the longitudinal beam 26 carrying the bracket members 25 is fixedly secured at its front and rear end to the free end of respective second arms 48. As described above, the bracket members 25 hold the suspension pins 24 which, in turn, suspend the whole grab assembly 6 in the manner as described above. In general terms, therefore, the described device is one embodiment of a loader, wherein the second arms 48 suspend said grab assembly 6 so as to allow for tilting of said assembly about the axis of the suspension pins 24 which is substantially parallel with the axis of pivotal movement of the first arms 42 (i.e. the axis of pivot joints 43).

The loader shown in the accompanying drawings is further provided with a mechanism for parallel motion, which is known per se and which is used in maintaining the inclined arm 40 at an constant inclination with regard to the surface of the platform 3, regardless of the position of the arms 42, 48.

The parallel motion mechanism is secured, at its one end, to the platform 3 by a pivot joint 50 secured to the bracket 44. A rod 51 connects the pivot 50 with another pivot joint 52 at the end of one arm of a bell-crank 53. The bell-crank 53 is mounted on the arm 42 for pivotal movement about the axis of the pivot joint 47. The other arm of the bell-crank 53 is connected, by a pivot 54, to one end of a link 55, the opposite end of which is, in turn, pivotally secured to an arm 56 (FIG. 5) which is mounted for pivotal movement about the extension of the front suspension pin 24. The bottom portion of the arm 56 is rigidly connected, through a rod 57 to an extension 58 of the inclined arm 40. As seen from FIG. 5, the extension 58 is provided with an auxiliary arm 59 one end of which is fixedly secured to the extension 58 and the free end of which is pivotal about the axis of the front suspension pin 24. The mechanism for parallel motion being well known, it will be appreciated that the above described arrangement of parts 50 through 59 maintains the angle of inclination of the arm 40 to the surface of the platform 3 substantially constant at any practical mutual position of the arms 42, 48 during the loading operation (see FIGS. 1–3).

It will now be appreciated that the parallel motion mechanism can be generally referred to as being connected to said grab lifting means 12, one end of said mechanism being secured to said platform 3 (e.g. by pivot 50), the other end of said mechanism being operatively connected to said grab assembly (e.g. by pin 11 in slot 41) to cause and maintain an inclination of the grab assembly 6 with respect to its upright suspended position (i.e. the position of FIG. 6), as the grab assembly 6 engages the bales 5a, 5.

Figure 8:
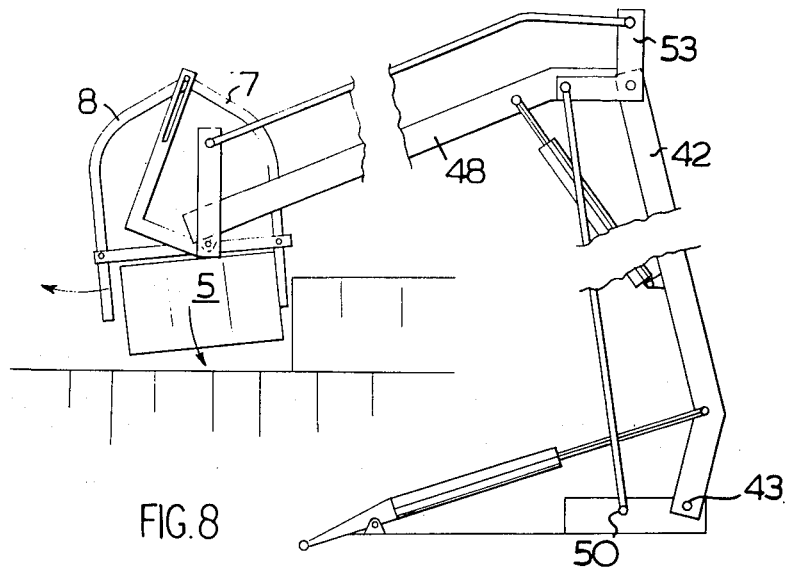
FIG. 8 is a front view of the mechanism for parallel motion, used in maintaining the grab assembly in an inclined position, the grab assembly itself being shown in the load release state.
Figure 9:
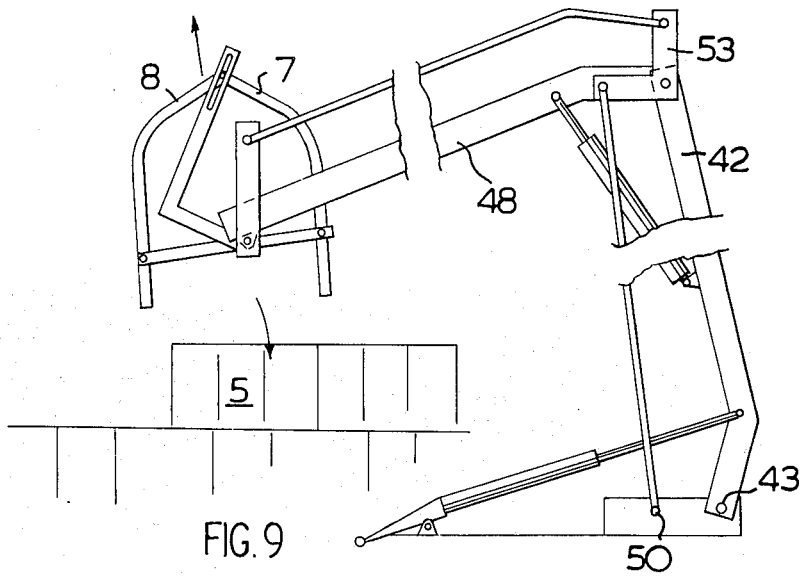
FIG. 9 is a view similar to that of FIG. 4 the grab assembly being shown shortly after assuming the load release state.
Figure 10:
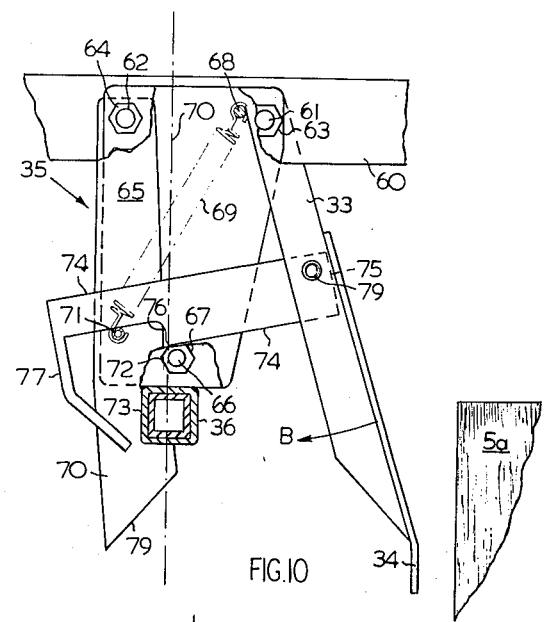
FIG. 10 is a partial side view of the locking means in a position wherein the grab assembly is maintained open.
Figure 11:
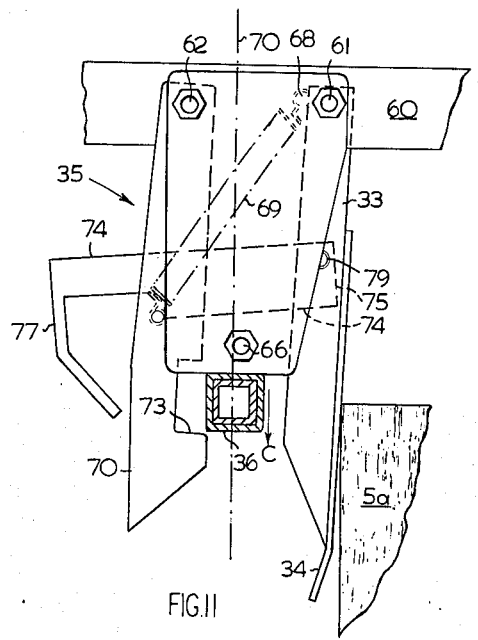
FIG. 11 is a side view similar to FIG. 10, showing the locking means released to allow the grab assembly to grab the load.
Figure 12:
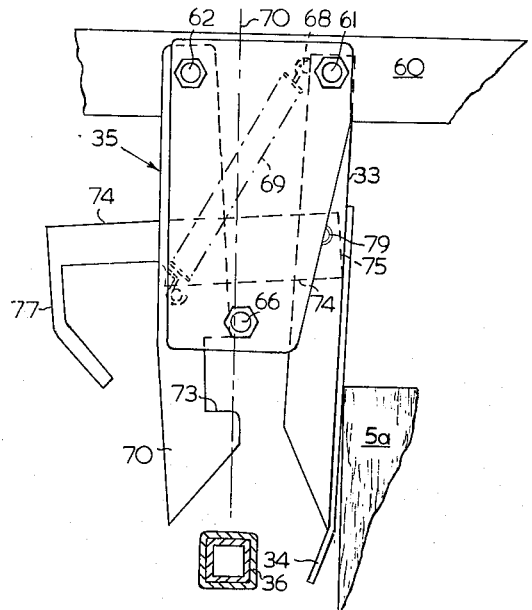
FIG. 12 is a side view similar to FIG. 10, showing the locking means during the lifting of the grab means with the load grabbed therein.
Figure 13:
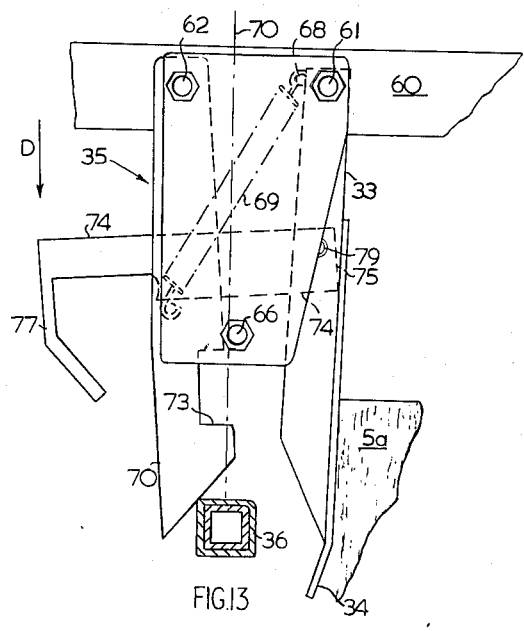
FIG. 13 is a side view similar to FIG. 10, showing the locking means at the time of its assuming the load release state.

Turning now to FIGS. 10–13, they show, in a side view, the arrangement and operation of the locking means 35. Compared with the previous figures of the drawings, it is firstly to be noted that mutual arrangement between the locking means and the telescopic beam 36 as shown in FIG. 10, corresponds to that of FIG. 6. The arrangement of FIG. 11 shows the position shortly after that of FIG. 6 but before assuming the position shown in FIG. 7. The arrangement of FIG. 12 corresponds to that of FIG. 7. Finally, FIG. 13 shows the locking means at the moment corresponding to FIG. 4. It is also to be noted that during the operation steps shown in FIGS. 8 and 9, the locking means assume the arrangement of FIG. 10, the only difference being in that the bale 5a is not in vicinity of the feeler plate 34. The locking means comprise a pair of suspending plates 60 (only one seen in FIGS. 10 etc.) which are fixedly secured, e.g. welded, to the longitudinal beam 26. Passing through the suspending plates 60 are two bolts 61, 62 the ends of which are provided with nuts 63, 64 for fixedly securing two frame plates 65 (only one seen in partially broken-away fashion in FIG. 10) to the suspending plates 60. A third bolt 66 with a nut 67 is fixed at the bottom portion of the frame plates 65.

The stem portion of the bolt 61 between the two plates 65 is used as a pivot joint receiving one end of the feeler 33, the lower portion of the feeler 33 being provided with the feeler plate 34 adapted to engage the end of bale 5a. The feeler 33 is provided at its upper end with a suspension member, e.g. pin 68 to which is connected one end of a tension spring 69.

Pivotally connected to the stem portion of the bolt 62 is a catch 70 which is made of two solid steel plates, only one of which can be seen in the side view of FIG. 10. Extending between the plates forming the catch 70 in the central portion thereof is a pin 71 to which is secured the opposite end of the spring 69. The catch 70 can thus be pivoted about the stem of bolt 62 and is urged by the spring 69 to rest with the portion 72 of its front face against the stem portion of the bolt 66. Thus, the catch 70 can swing about the bolt 62 from its position shown in FIG. 10 only in clockwise direction.

The lower portion 73 of the front face of the catch 70 is provided with a recess, the shape of which corresponds to the shape of cross section of its adjacent surface of the telescopic beam 36. The recess 73 as shown in FIG. 10 is in engagement with the beam 36. In other words, the locking means 35 is now "locked" to support the grab assembly 6.

Pivotally secured to the middle portion of the feeler 33 is a pawl 74 the front face 75 of which is made to extend close to the rear surface of the feeler plate 34, thereby substantially limiting the pivotal movement of the pawl 74 about a pin 76 which secures the pawl 74 to the feeler 33. The pawl 74 can pivot about the pin 76 by a small angle of approximately 15°, further movement being restricted by either upper or lower portion of the front face 75 getting into touch with the feeler plate 34.

The lower edge of the pawl 74 is provided with a shoulder 76 which, in FIG. 10, engages the pin 71 of the catch 70, to transfer pivotal movement of feeler 33 (arrow B—FIG. 10) to the catch 70.

Fixedly secured to the rear portion of the pawl 74 is a guide plate 77, the free end of which is arranged to bear against the beam 36, to secure the position of the shoulder 76 in engagement with the pin 71.

The bottom edge 79 of the catch 70 is bevelled to provide the catch 70 with a guiding surface the purpose of which is apparent from FIG. 13.

Referring now to FIG. 10, FIG. 1 and FIG. 6, all of which show the same state of the apparatus, it will be appreciated that the grab assembly 6 is now in its uppermost position with respect to the longitudinal beam 26, with toggle links 22, 23 straightened and the jaws 7, 8 open. Thus, the grab assembly now rests with the bottom portion of the telescopic beam 36 being supported on the horizontal portion of the recess 73 in the catch 70, rather than being suspended by the toggle suspension pins 24. The grab lifting means 12 now hold the grab assembly 6 in the position as shown in FIG. 1.

The tractor 1 tows the platform 3 along the row of bales 5a, 5 resting on the ground, with the bales entering the grab assembly from the front. Eventually, the end bale 5a hits the feeler plate 34 to turn the feeler 33 clockwise (FIG. 11). The movement of feeler 33 is transformed through the shoulder 76 of the pawl 74 and pin 71 to the catch 70 which also moves clockwise, about the bolt 72. As soon as the front edge of the recess or notch 73 is moved beyond the bottom surface of the beam 36, the whole grab assembly is no longer supported by the recess 73 and instantly drops (arrow C—FIG. 11) to be suspended by the suspension pins 24, with toggle links 22, 23 now urging the jaws 7, 8 to grab with their side rails 27, 28 the row of bales disposed within the cage of the grab assembly.

Further pivoting of the pawl 74 required if the shoulder 76 has to follow pin 71 is prevented by the lower edge of the front face 75 of the pawl 74 getting into contact with the feeler plate 34. At this moment the pawl 74 and the feeler 33 form a rigid unit. Thus, the shoulder 76 now moves clockwise on a circular path about the bolt 61 and cannot follow the path of the pin 71 which moves clockwise about the bolt 62. Eventually, the shoulder 76 slips out of engagement with the pin 71.

The catch 70 is now urged by the spring 69 to turn bakc to its original position with the portion 72 resting against the bolt 66, but not engaging with the beam 36 which, as described above, drops down along with the whole grab assembly 6.

Figure 4:
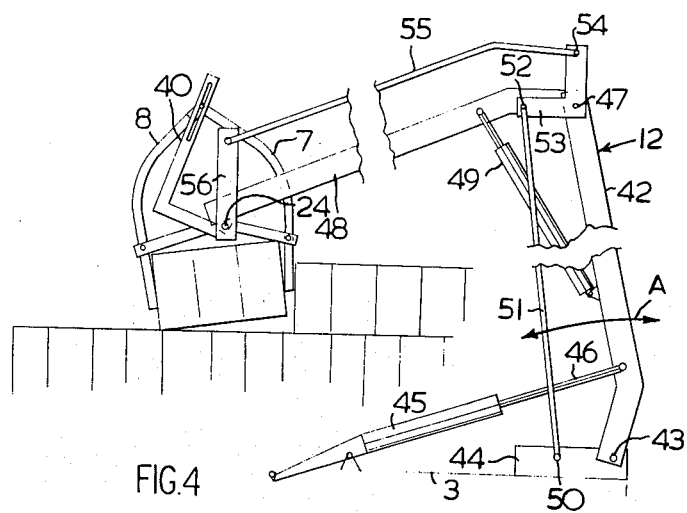
FIG. 4 is a schematic view of the device as seen from the tractor towing the platform, the grab assembly being shown shortly before assuming the load release state.

The grab assembly is lifted by the grab lifting means 12 to deposit the grabbed row of bales 5a, 5 on the platform (FIGS. 2, 3, 4).

When the bales 5a, 5 touch the surface of the platform 3 or of other bales already deposited thereon (FIG. 4), the grab assembly ceases being suspended by the suspension pin 24. Its weight is now supported by the jaws 7, 8 and/or by the top rails 29, 30. In effect, the longitudinal beam 26 now presses the suspension pins 24 down to force the jaws 7, 8 to open and to bring the toggle links 22, 23 from their angular arrangement (FIG. 7) to straight position (FIG. 6). By doing so, the longitudinal beam 26 along with the parts fixedly secured thereto are lowered (arrow D—FIG. 13) with respect to the grab assembly 6. Such movement brings the catch 70 back into contact with the beam 36, by the bevelled bottom edge 78. As the downward movement of the catch 70 continues, the catch is turned clockwise (FIG. 13) about the bolt 62, against the action of the spring 69, until the recess 73 can again catch the beam 36.

Subsequent lifting of the longitudinal beam 26 by grab lifting means 12 will bring the grab assembly 6 into a state wherein it is again supported by the catch 70 through the beam 36. The jaws 7, 8 are now maintained in open position FIGS. 8, 9) and can be lifted leaving the row of bales 5a, 5 on the platform 3. As soon as the grab assembly 6 is lifted to bring the feeler plate 34 out of contact with the end of bale 5a, the feeler 33, urged by the spring 69 turns back to its original position (FIG. 10). By doing so, the free end of the guide plate 77 hits the beam 36 (which by now has been engaged by the recess 73), to secure that the pawl 74 is turned anti-clockwise about the pin 79, to bring the shoulder 76 back into operative position against the pin 71 of the catch 70, i.e. into position shown in FIG. 10.

Those skilled in the art will appreciate that the present invention provides for a relatively simple and effective device. The loading of rows of the bales corresponding in length to the length of the platform speeds up the operation. The inclination of the row of bales (FIG. 4 and relating figures) at the moment of its release on the platform provides for compacting of adjacent rows of bales, at the same time eliminating the disturbance of previously loaded row of bales by the jaws 7 as the grab assembly 6 is lifted after release of its load. The released load thus tilts towards the preceding row with adjacent sides of the rows of bales being sidewise compacted.

The bales in each row are also compact in end-to-end relation, the end-to-end compactness being maintained due to the disclosed way in which the row of bales is taken by the grab assembly. Tests have shown that the compactness of the entire stack loaded on the platform, both side-wise and in end-to-end direction is superior to prior art. Thus, subsequent handling of the entire stack is facilitated.

The locking means facilitate the overall control of the apparatus. The operator, who can normally see only the front end of the cage of the grab assembly, knows about the first-to-enter bale 5a having reached the rear end of the assembly by the "drop" of the grab assembly following the described release of the locking means.

As mentioned hereinbefore, the described preferred embodiment of the present invention is to be considered merely as an example which can be modified to a greater or lesser degree, without departing from the scope of the present invention as defined in the accompanying claims.

The embodiments of the invention in which an exclusive property or privilege is claimed are defined as follows:

1. A bale loader adapted to be secured to a mobile platform on which bales are to be loaded, comprising:
   a. an elongated suspended mechanical grab assembly including depending, pivoted jaws defining the sides of the assembly, said assembly having a front end and a rear end generally coincident with front and rear ends of said platform, respectively;
   b. grab lifting means supported by said platform;
   c. said grab lifting means being secured to said grab assembly so as to suspend same, and being arranged to lift said grab assembly from a load engagement position wherein said grab assembly extends along one side of said platform a short distance above the ground, to a load release position in which the jaws release the load to deposit same on said platform;
   d. locking means operatively connected to said grab assembly for releasably maintaining said jaws in open position;
   e. a movable feeler means operatively connected with the locking means to release same upon actuation of the feeler; said feeler means being located at the rear end of the grab assembly and being actuated by horizontal relative movement thereagainst of a bale as the grab assembly with the jaws open is moved along and over at least one bale, with the bale resting on the ground and being located between the jaws, when said end of the bale reaches said rear end of the grab assembly to actuate said movable feeler.

2. A bale loader as claimed in claim 1, including means for bringing the grab assembly into an inclined position when the grab assembly engages said load.

3. A bale loader as claimed in claim 2, wherein said means for maintaining the grab assembly in an inclined position comprise
   a. a guiding slot member slidably receiving a guide pin, said guide pin being secured to said grab assembly;
   b. said guiding slot member being provided with means for maintaining said slot member at a substantially constant inclination with respect to said platform.

4. A bale loader as claimed in claim 2, wherein said grab lifting means include:
   a. a first arm secured with its one end to said platform at a first joint for pivotal movement about an axis substantially coincident with one side of said platform;
   b. a second arm, one end of which is pivotally secured at a second joint to a free end of said first arm for pivotal movement about an axis substantially parallel with the axis of pivotal movement of said first arm;
   c. said second arm suspending at its other end said grab assembly so as to allow for tilting of said assembly about an axis substantially parallel with said axis of pivotal movement of said first arm; and
   d. a mechanism for parallel motion connected to said grab lifting means, one end of said mechanism being secured to said platform, the other end of said mechanism being operatively connected to said grab assembly to cause and maintain an inclination of said grab assembly with respect to its upright suspended position as the grab assembly engages said bale.

5. A bale loader as claimed in claim 4, wherein said lifting means include arm assemblies, each consisting of said first and said second arm, one of said arm assemblies being disposed at the front end of said platform, the other of the arm assemblies being disposed at the rear end of said platform, and a longitudinal beam for suspending the grab assembly, said beam extending between said other ends of said second arms of the grab lifting means.

6. A bale loader as claimed in claim 1, wherein said grab assembly includes a plurality of jaws, each of said jaws consisting of two arms hingedly secured to one another and interconnected with a toggle joint, said toggle joint being suspended from said grab lifting means, and two elongated bale engaging members fixedly secured at both sides of the grab assembly to the lower portions of said jaws and extending along the grab assembly to form a cage structure with same.

7. A bale loader as claimed in claim 6, wherein said toggle joints include pairs of toggle links, each pair comprising two links of uneven length whereby the toggle joints are suspended along an axis of suspension which is located between said jaws, said axis of suspension being substantially parallel with the longitudinal axis of said cage structure, the axis of suspension being disposed closer to one side of the cage structure to cause sideways inclination of same when the cage is suspended by said toggle joints.

8. A bale loader as claimed in claim 5, wherein the locking means consists of a catch-and-feeler assembly and a telescopic beam assembly, wherein
   a. said telescopic beam assembly is secured with its opposite ends to the jaws at the rear end of the grab assembly to extend transversely across the grab assembly;
   b. the catch-and-feeler assembly being secured to said longitudinal beam above said telescopic beam;
   c. the catch-and-feeler assembly includes a catch provided at its lower end with a notch adapted to engage said telescopic beam, the upper end of said catch being pivotal about an axis substantially parallel with said telescopic beam, the pawl being spring urged to a position wherein said notch can engage said telescopic beam;

d. said feeler being pivotable about an axis substantially parallel but spaced from the axis of pivotable movement of said catch, said feeler being provided with an actuating pawl, one end of said actuating pawl being pivotally connected to said feeler, the opposite end of said actuating lever being provided with a shoulder adapted to engage said catch to pivot the catch out of engagement with said telescopic beam, the pivotal movement of said actuating pawl with respect to said feeler being limited to secure disengagement between said shoulder and said catch after said catch has been pivoted to a position wherein the notch is disengaged from said telescopic beam, whereby the spring-urged pawl can pivot back to its original position in which it is capable of engagement with said telescopic beam.

* * * * *